Patented Nov. 2, 1937

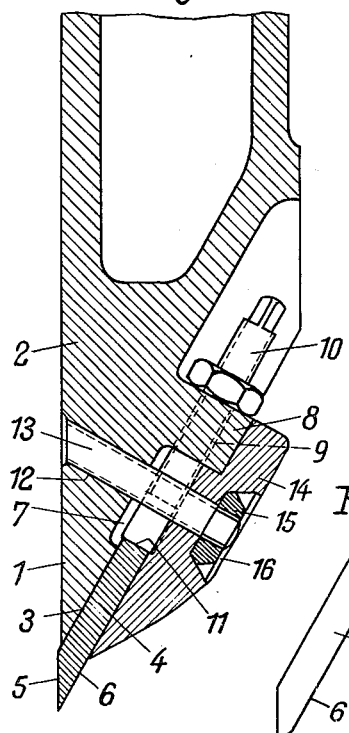
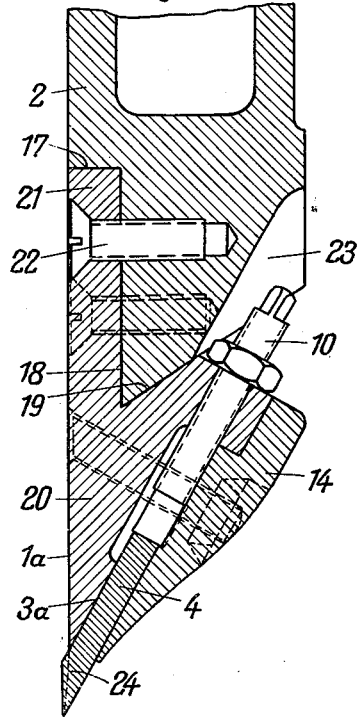
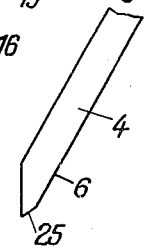
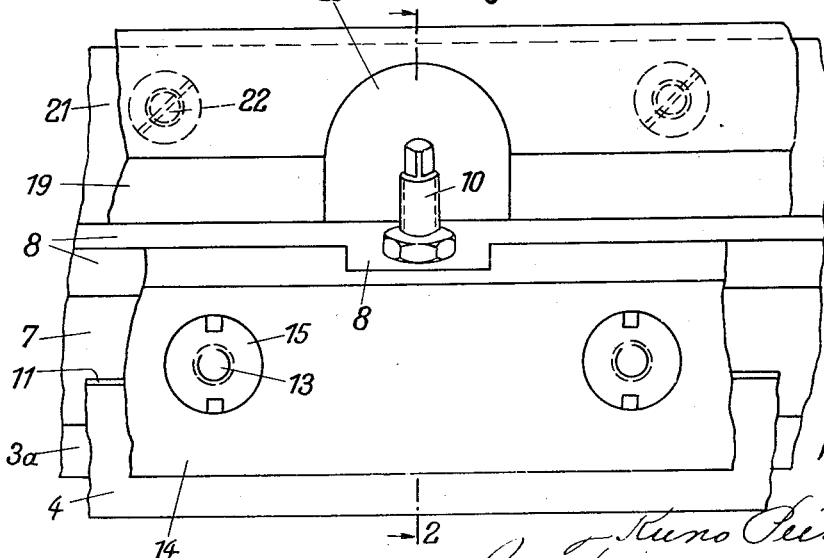

2,098,159

UNITED STATES PATENT OFFICE 2,098,159

CUTTING DEVICE

Kuno Peiseler, Leipzig, Germany, assignor to Karl Biagosch, Leipzig, Germany

Application August 23, 1935, Serial No. 37,559
In Germany May 25, 1935

6 Claims. (Cl. 164—58)

This invention relates to cutting devices for cutting machines and the like.

The invention is particularly concerned with an arrangement of a cutting device in machines of the class designated, in which the steel or like cutter is not fixed in the usual manner by soldering or welding to a surface of the knife body extending parallel with the face of the cutter, whereby the knife body and the steel cutter bearing are firmly connected to form a unit, but in which the steel cutter remains an independent part and is connected with its carrier only by mechanical means in such a manner that it can be separated from its carrier for sharpening and can, on refixing, be adjusted or reset for the purpose of compensating for the shortening of the cutter due to sharpening. According to the invention, a clamping surface which extends in the direction of the back angle of the edge of the cutter is provided either upon a carrier which corresponds to the hitherto usual knife body and is fixed to the knife holder of the machine, or is provided directly upon the knife holder of the machine, omitting a separate carrier, and the steel cutter is fixed adjustably upon this clamping surface. When providing the clamping surface upon the knife holder itself, there are provided only in the vicinity of the upper edge of the inclined clamping surface pocket-like recesses for the reception of the setting and pressing screws.

If, for instance, with a view to improving or simplifying the manufacture, it is preferred to make the steel cutter carrier as a separate part distinct from the knife holder, the fixing of the carrier to the knife holder is, according to the invention, preferably carried out without consideration to its detachability from the knife holder, this being rendered possible by the fact that it is no longer necessary to separate the steel cutter carrier from the knife holder for the purpose of sharpening the knife, inasmuch as the steel cutter separated from its carrier may be sharpened after removal and may be reclamped after sharpening. The knife carrier or knife clamping body is fixed to the knife holder of the machine according to the invention in such a manner that a wedge-shaped underedge of the knife holder engages a wedge-shaped groove of the knife carrier, and the wedge groove surface of the carrier which runs parallel with the face of the knife carrier is screwed fast to the corresponding wedge surface of the knife holder, for instance by means of head screws having their female threads in the knife holder.

Apart from economy of material, the invention has the main advantage that in the selection of the materials of the knife, one is not limited to any particular kind of steel or cutting metal which can be welded or soldered in knife form, but can use any kind of steel or metal suitable for cutting. A particular advantage of arranging the cutter inclined with regard to the plane in which the cut is made, is the fact that this arrangement enables the edge to be hollowed or under-ground, which is particularly advantageous for trimming work. It is not essential whether the steel cuter be made entirely of steel or merely covered with steel or like material.

Two constructional examples embodying the invention are illustrated in the accompanying drawing, in which Figure 1 shows in cross section the fixing of a steel cutter directly to the knife holder of a cutting machine; Fig. 2 shows likewise in section on line 2—2 of Fig. 3 the fixing of a steel cutter to a knife holder by means of a separate cutter carrier; Fig. 3 is a partial front view of the construction according to Fig. 2; and Fig. 4, an elevation of a steel cutter with double back angle.

Referring first to the construction shown in Fig. 1, the lower portion of the face of the knife holder 2 contains with the back surface extending in the direction of the cut, an acute angle which is equal to the back angle of the knife edge. The surface 3 of the knife holder which extends at an angle to the direction of cutting, forms the bearing and guiding surface of the steel cutter 4. The face 5 of the cutter is inclined with respect to the two parallel sides of the cutter, whilst the back 6 of the edge coincides with one of the sides of the cutter. Above the inclined surface 3 there extends over the length of the knife upon the face of the knife holder a groove-like recess 7 which is bordered at the top by rib-like projections 8. In these rib-like projections 8 are provided several bores 9 parallel to the knife 4 and provided with female threads for set-screws 10, the lower ends of which bear against the shoulder 11 of the cutter. In the portion containing the recesses 7 there are provided in the wedge-shaped lower end of the knife holder, bores 12 at right angles to the inclined surface 3 which are provided with female threads for screws 13, the latter being used for the clamping of the cutter 4 against the clamping surface 3 by means of a pressing plate 14. The clamping is effected by means of nuts 15 having conical bearing surfaces and inserted into recesses 16 in the pressing plates 14 having corresponding conical bearing surfaces. The nuts 15 are screwed upon the screws 13. The face of the pressing plate 14 is slightly arched so as to gradually push away the cut-off portion of the staple upon the knife entering the staple.

In the construction according to Fig. 2 the knife holder has the usual shape and arrangement of the lower end, namely, upon the side lying in the cutting plane, a rectangular recess which is bordered by a horizontal surface 17 and a vertical surface 18 parallel to the cutting plane. The surface 18 together with the underside 19 which rises upwardly in an inclined direction towards the face of the holder, border the wedge-shaped lower end of the knife holder. Upon this wedge-shaped end of the knife holder 2 is placed by means of a corresponding wedge-shaped groove a knife carrier 20 which has an upwardly extending projection 21 fitting the recess of the knife holder bordered by the surfaces 17 and 18. The projection 21 is fixed to the knife holder by means of the head screws 22 so that it is firmly clamped against the surface 18 of the knife holder. The knife carrier 20 contains a clamping surface 3a inclined with regard to the cutting plane 1a. The cutter steel 4 is clamped to this clamping surface in the previously described manner. In this construction, there are required in the inclined underside 19 of the knife holder, only a few pocket-like recesses 23 for the upper ends of the set-screws 10.

For grinding the knife it is only necessary to loosen the nut 13 whereupon on lifting the knife holder, the steel cutter will slide by itself from between the knife holder and the pressing plate. The described knife arrangement enables the edge to be hollow- or under-ground, as indicated in Fig. 2 by the dotted line 24.

If, for some cutting operations, it should be necessary to provide in addition to the usual back 6 an additional back 25, the latter may be ground at the required angle on to the back 6 (Fig. 4).

I claim:—

1. In a cutter for paper cutting machines and the like, a carrier body having a wedge-shaped lower edge portion, the front face of said wedge portion being vertical and the rear face thereof being inclined at an acute angle to said front face, said body having a rib extending longitudinally of the rear face of the body and spaced from said edge portion, a clamping plate, said clamping plate having upper and lower inner faces parallel to the rear face of the body, the upper face of said clamping plate being offset and seating against the outer face of said rib, clamping screws connecting said body and clamping plate between said rib and said edge portion of said body, a cutter blade held between the lower portions of said body and plate and having a beveled cutting edge and parallel front and rear faces, and adjusting screws passing through said rib and engaging the upper edge of said blade.

2. The structure of claim 1, and said clamping screws being arranged perpendicularly to the rear face of the wedge portion of the body.

3. The structure of claim 1, a vertical flange extending up from the said body, a knife holder, and means securing said flange to the knife holder.

4. The structure of claim 1, said clamping screws being arranged perpendicularly to the rear face of the wedge portion of the body, a vertical flange extending up from the said body, a knife holder, and means securing said flange to the knife holder.

5. The structure of claim 1, said clamping screws being arranged perpendicularly to the rear face of the wedge portion of the body, a vertical flange extending up from the said body, a knife holder, and means securing said flange to the knife holder, the lower edge of said knife holder being of wedge shape and the upper face of the body being cooperatingly beveled to form with the flange a wedge-shaped groove fitting the lower edge of the knife holder.

6. The structure of claim 1, said rib having longitudinally spaced projections on its outer face opposite the locations of said adjusting screws, and said clamping plate being recessed to receive said projections.

KUNO PEISELER.